US009240197B2

(12) United States Patent
Begeja et al.

(10) Patent No.: US 9,240,197 B2
(45) Date of Patent: Jan. 19, 2016

(54) LIBRARY OF EXISTING SPOKEN DIALOG DATA FOR USE IN GENERATING NEW NATURAL LANGUAGE SPOKEN DIALOG SYSTEMS

(71) Applicant: AT&T Intellectual Property II, L.P., Atlanta, GA (US)

(72) Inventors: Lee Begeja, Gillette, NJ (US); Giuseppe DiFabbrizio, Florham Park, NJ (US); David Crawford Gibbon, Lincroft, NJ (US); Dilek Z. Hakkani-Tur, Denville, NJ (US); Zhu Liu, Marlboro, NJ (US); Bernard S. Renger, New Providence, NJ (US); Behzad Shahraray, Holmdel, NJ (US); Gokhan Tur, Denville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 13/933,170

(22) Filed: Jul. 2, 2013

(65) Prior Publication Data

US 2013/0325443 A1    Dec. 5, 2013

Related U.S. Application Data

(63) Continuation of application No. 11/029,319, filed on Jan. 5, 2005, now Pat. No. 8,478,589.

(51) Int. Cl.
*G10L 15/22* (2006.01)
*G10L 25/48* (2013.01)
(Continued)

(52) U.S. Cl.
CPC ............ *G10L 25/48* (2013.01); *G10L 15/063* (2013.01); *G10L 15/1815* (2013.01); *G10L 15/22* (2013.01); *G10L 15/28* (2013.01)

(58) Field of Classification Search
CPC ....... G10L 15/22; G10L 15/265; G10L 15/08; G10L 15/063; G10L 15/183; G10L 15/1822

USPC ................................... 704/257, 251
See application file for complete search history.

(56) References Cited

U.S. PATENT DOCUMENTS 5,675,707 A    10/1997    Gorin et al.
5,771,276 A    6/1998    Wolf
(Continued)

FOREIGN PATENT DOCUMENTS

EP    1 280 136 A    1/2003
WO    WO 99/14740    3/1999
(Continued)

OTHER PUBLICATIONS

Rukmini Iyer et al., "Using Out-of-Domain Data to Improve In-Domain Language Models", IEEE Signal Processing Letters, vol. 4, No. 8, Aug. 1997, pp. 221-223.
(Continued)

*Primary Examiner* — Richemond Dorvil
*Assistant Examiner* — Michael Ortiz Sanchez

(57) ABSTRACT

A machine-readable medium may include a group of reusable components for building a spoken dialog system. The reusable components may include a group of previously collected audible utterances. A machine-implemented method to build a library of reusable components for use in building a natural language spoken dialog system may include storing a dataset in a database. The dataset may include a group of reusable components for building a spoken dialog system. The reusable components may further include a group of previously collected audible utterances. A second method may include storing at least one set of data. Each one of the at least one set of data may include ones of the reusable components associated with audible data collected during a different collection phase.

20 Claims, 4 Drawing Sheets

(51) Int. Cl.
*G10L 15/06* (2013.01)
*G10L 15/18* (2013.01)
*G10L 15/28* (2013.01)

(56) References Cited

U.S. PATENT DOCUMENTS

| | | | |
|---|---|---|---|
| 5,794,205 A * | 8/1998 | Walters et al. | 704/275 |
| 5,930,700 A * | 7/1999 | Pepper et al. | 455/435.3 |
| 5,963,894 A | 10/1999 | Richardson et al. | |
| 6,021,384 A | 2/2000 | Gorin et al. | |
| 6,044,337 A | 3/2000 | Gorin et al. | |
| 6,173,261 B1 | 1/2001 | Arai et al. | |
| 6,173,266 B1 | 1/2001 | Marx et al. | |
| 6,219,643 B1 | 4/2001 | Cohen et al. | |
| 6,266,400 B1 * | 7/2001 | Castagna | 379/88.25 |
| 6,453,307 B1 | 9/2002 | Schapire et al. | |
| 6,571,240 B1 * | 5/2003 | Ho et al. | |
| 7,039,625 B2 | 5/2006 | Kim et al. | |
| 7,171,349 B1 | 1/2007 | Wakefield et al. | |
| 7,197,460 B1 | 3/2007 | Gupta et al. | |
| 7,206,391 B2 * | 4/2007 | Chiu et al. | 379/88.25 |
| 7,228,278 B2 | 6/2007 | Nguyen et al. | |
| 7,292,979 B2 | 11/2007 | Karas et al. | |
| 7,398,201 B2 | 7/2008 | Marchisio et al. | |
| 7,860,713 B2 | 12/2010 | Alonso et al. | |
| 8,433,053 B2 * | 4/2013 | Ulug et al. | 379/266.07 |
| 2002/0032564 A1 | 3/2002 | Ehsani et al. | |
| 2002/0128821 A1 | 9/2002 | Ehsani et al. | |
| 2002/0198719 A1 | 12/2002 | Gergic et al. | |
| 2003/0007609 A1 | 1/2003 | Yuen et al. | |
| 2003/0009339 A1 | 1/2003 | Yuen et al. | |
| 2003/0014260 A1 | 1/2003 | Coffman et al. | |
| 2003/0043978 A1 * | 3/2003 | Gallagher | 379/88.18 |
| 2003/0105634 A1 | 6/2003 | Abella et al. | |
| 2003/0105638 A1 * | 6/2003 | Taira | G06F 17/2881 704/275 |
| 2003/0130841 A1 | 7/2003 | Bangalore et al. | |
| 2003/0130854 A1 | 7/2003 | Galanes et al. | |
| 2003/0154072 A1 | 8/2003 | Young et al. | |
| 2003/0187648 A1 | 10/2003 | Dharanipragada et al. | |
| 2003/0200094 A1 | 10/2003 | Gupta et al. | |
| 2004/0006457 A1 | 1/2004 | Dehlinger et al. | |
| 2004/0019478 A1 | 1/2004 | Rucker et al. | |
| 2004/0085162 A1 | 5/2004 | Agarwal et al. | |
| 2004/0122661 A1 | 6/2004 | Hawkinson et al. | |
| 2004/0186723 A1 | 9/2004 | Mizutani et al. | |
| 2004/0199375 A1 | 10/2004 | Ehsani et al. | |
| 2004/0204940 A1 | 10/2004 | Alshawi et al. | |
| 2004/0225499 A1 | 11/2004 | Wang et al. | |
| 2004/0249636 A1 | 12/2004 | Applebaum et al. | |
| 2005/0091057 A1 | 4/2005 | Phillips et al. | |
| 2005/0105712 A1 | 5/2005 | Williams et al. | |
| 2005/0135338 A1 | 6/2005 | Chiu et al. | |
| 2005/0234727 A1 * | 10/2005 | Chiu | 704/270.1 |
| 2005/0283764 A1 | 12/2005 | Chiu | |
| 2006/0009973 A1 | 1/2006 | Nguyen et al. | |
| 2006/0025997 A1 | 2/2006 | Law et al. | |
| 2006/0080639 A1 | 4/2006 | Bustelo et al. | |
| 2006/0136870 A1 | 6/2006 | Wilson et al. | |
| 2006/0149555 A1 | 7/2006 | Fabbrizio et al. | |
| 2007/0061758 A1 | 3/2007 | Manson et al. | |
| 2009/0202049 A1 * | 8/2009 | Ulug et al. | 379/88.03 |
| 2010/0268536 A1 * | 10/2010 | Suendermann et al. | 704/243 |

FOREIGN PATENT DOCUMENTS

WO    WO 9917524 A1 *  4/1999
WO    WO 03/088080     10/2003

OTHER PUBLICATIONS

M. Levit. "Spoken Language Understanding without Transcriptions in a Call Center Scenario", Technische Kakultat der Uiversitat Erlangen-Nurnberg. Oct. 18, 2004.

Baggia, P. et al., "Language Modeling and Spoken Dialogue Systems—the ARISE experience," Proc. Eurospech-'99, 1999.

E. Fosler-Lussier et al., "Using semantic class information for rapid Development of language models within asr dialogue systems," in Proceedings of ICASSP01, Salt Lake City, USA 2001, pp. 553-556.

Garijo, F.J. et al., BOGAR_LN: An Agent Based Component Framework for Developing Multi-modal Services using Natural Language, Lecture Notes in Artificial Intelligence, vol. 3040, pp. 207,220, Coriejo Urretavizcaya Perez de la cruz Eds. Springer-Verlag, 2004.

Rukmini Iyer et al., "Relevance weighting for combining multi-domain data for n-gram language modeling", Computer Speech and Language, 13:267-282, 1999.

Tang et al., "Call-type classification and unsupervised training for the call center domain," Automatic Speech Recognition and Understanding, 2003, ASRU '03, IEEE Workshop on St. Thomas, VI, Nov. 30-Dec. 3, 2003, pp. 204-208.

Iyer et al., "Unsupervised training techniques for natural language call routing", 2002 IEEE International Conference on Acoustics, Speech and Signal Processing, May 13-17, 2002, vol. 4, pp. IV-3900-IV-3903.

Di Fabbrizio et al., "Bootstrapping Spoken Dialog Systems with Data Reuse," AT&T Labs Research, Apr. 30, 2004.

Giuseppe Riccardi and Dilek Hakkani-Tur, 2003, Active and Unsupervised learning for automatic speech recognition, In Proceedings of the European Conference on Speech Communication and Technology (EUROSPEECH), Geneva, Switzerland, Sep. 2003.

Gokhan Tür et al. "Unsupervised Learning for Spoken Language Understanding". AT&T Labs—Research, Florham Park, New Jersey, USA, Sep. 2003.

Di Fabbrizio et al., "Bootstrapping spoken dialog systems with data reuse," In Proceedings of 5$^{th}$ SigDial Workshop on Discourse and Dialogue, Boston, MA, May 2004.

Guillevic et al., "Robust semantic confidence scoring," In Proc. Internat. Conf. on Spoken Language Processing '02, Denver, pp. 853-856.

Rochery et al., "Combining prior knowledge and boosting for call classification in spoken language dialogue," In International Conference on Acoustics, Speech and Signal Processing, 2002.

Gokhan Tür et al. "Active Labeling for Spoken Language Understanding". AT&T Labs—Research, Florham Park, New Jersey, USA, Sep. 2003.

Gokhan Tür et al., "Active Learning for Spoken Language Understanding", AT&T Labs—Research, Florham Park, New Jersey, USA, May 2003.

Ammicht et al., "Knowledge Collection for Natural Language Spoken Dialog Systems," AT&T Labs, EUROSPEECH 1999, vol. 1, Sep. 1999, p. 1375.

Tur et al., "Active Learning for Spoken Language Understanding," ICASSP 2003, pp. 276-279.

Hakkani-Tur et al., "Unsupervised and Active Learning in Automatic Speech Recognition for Call Classification," Acoustics, Speech and Signal Processing, IEEE International Conference in Montreal, Quebec, Canada, May 17-21, 2004, vol. 1, pp. 429-432.

* cited by examiner

LIBRARY OF EXISTING SPOKEN DIALOG DATA FOR USE IN GENERATING NEW NATURAL LANGUAGE SPOKEN DIALOG SYSTEMS

PRIORITY

The present application is a continuation of U.S. patent application Ser. No. 11/029,319, filed Jan. 5, 2005, which is incorporated herein by reference in its entirety.

RELATED APPLICATIONS

The present invention is related to U.S. patent application Ser. No. 11/029,317, filed Jan. 5, 2005, entitled "A SYSTEM AND METHOD FOR USING A LIBRARY OF DATA TO INTERACTIVELY DESIGN NATURAL LANGUAGE SPOKEN DIALOG SYSTEMS," U.S. patent application Ser. No. 11/029,798, filed Jan. 5, 2005, now U.S. Pat. No. 8,185,399, entitled "A SYSTEM OF PROVIDING AN AUTOMATED DATA-COLLECTION IN SPOKEN DIALOG SYSTEMS," and U.S. patent application Ser. No. 11/029,318, filed Jan. 5, 2005, entitled "BOOTSTRAPPING SPOKEN DIALOG SYSTEMS WITH DATA REUSE." The contents of the above U.S. Patent Applications are herein incorporated by reference in their entirety.

BACKGROUND OF THE INVENTION

1. Field of the Invention

The present invention relates to speech processing and more specifically to reusing existing spoken dialog data to generate a new natural language spoken dialog system.

2. Introduction

Natural language spoken dialog systems receive spoken language as input, analyze the received spoken language input to derive meaning from the input, and perform some action, which may include generating speech, based on the meaning derived from the input. Building natural language spoken dialog systems requires large amounts of human intervention. For example, a number of recorded speech utterances may require manual transcription and labeling for the system to reach a useful level of performance for operational service. In addition, the design of such complex systems typically includes a human being, such as, a User Experience (UE) expert to manually analyze and define system core functionalities, such as, a system's semantic scope (call-types and named entities) and a dialog manager strategy, which will drive the human-machine interaction. This approach to building natural language spoken dialog systems is extensive and error prone because it involves the UE expert making non-trivial design decisions, the results of which can only be evaluated after the actual system deployment. Thus, a complex system may require the UE expert to define the system's core functionalities via several design cycles that may include defining or redefining the core functionalities, deploying the system, and analyzing the performance of the system. Moreover, scalability is compromised by time, costs and the high level of UE know-how needed to reach a consistent design. A new approach that reduces the amount of human intervention required to build a natural language spoken dialog system is desired.

SUMMARY OF THE INVENTION

In a first aspect of the invention, a machine-readable medium is provided. The machine-readable medium may include a group of reusable components for building a spoken dialog system. The reusable components may include a group of previously collected audible utterances. In some implementations consistent with the principles of the invention, the collected audible utterances may be transcribed and semantically labeled (e.g., with associated call-types and named entities).

In a second aspect of the invention, a machine-implemented method to build a library of reusable components for use in building a natural language spoken dialog system is provided. The method may include storing a dataset in a database. The dataset may include a group of reusable components for building a spoken dialog system. The reusable components may further include a group of previously collected audible utterances. In some implementations consistent with the principles of the invention, the collected audible utterances may be optionally transcribed and semantically labeled (e.g., with associated call-types and named entities).

In a third aspect of the invention, a method to build a library of reusable components for use in building a natural language spoken dialog system is provided. The method may include storing at least one set of data, each one of the at least one set of data including ones of the reusable components associated with audible data collected during a different collection phase.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

Natural Language Spoken Dialog Systems

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
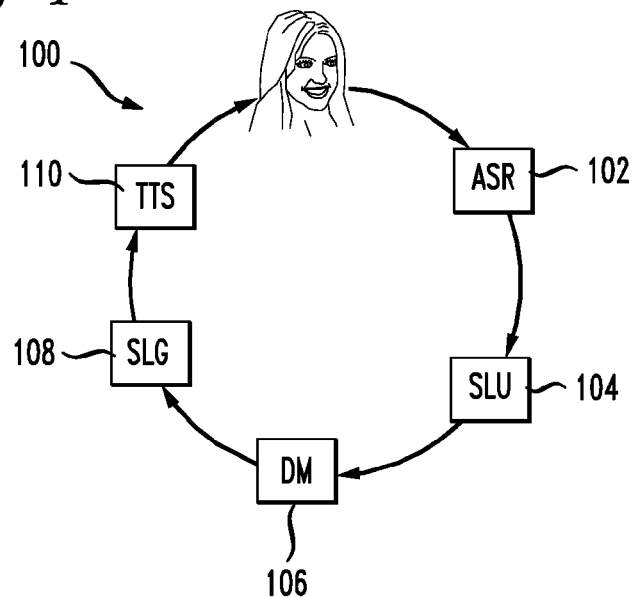
FIG. 1 is a functional block diagram of an exemplary natural language spoken dialog system.

FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. DM module 106 may receive the meaning of the speech input as input and may determine an action, such as, for example, providing a spoken response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having an audio processing capability, for example a PDA with audio and a WiFi network interface) may have an ASR module wherein a user may say "call mom" and the smartphone may act on the instruction without a "spoken dialog interaction".

Figure 2:
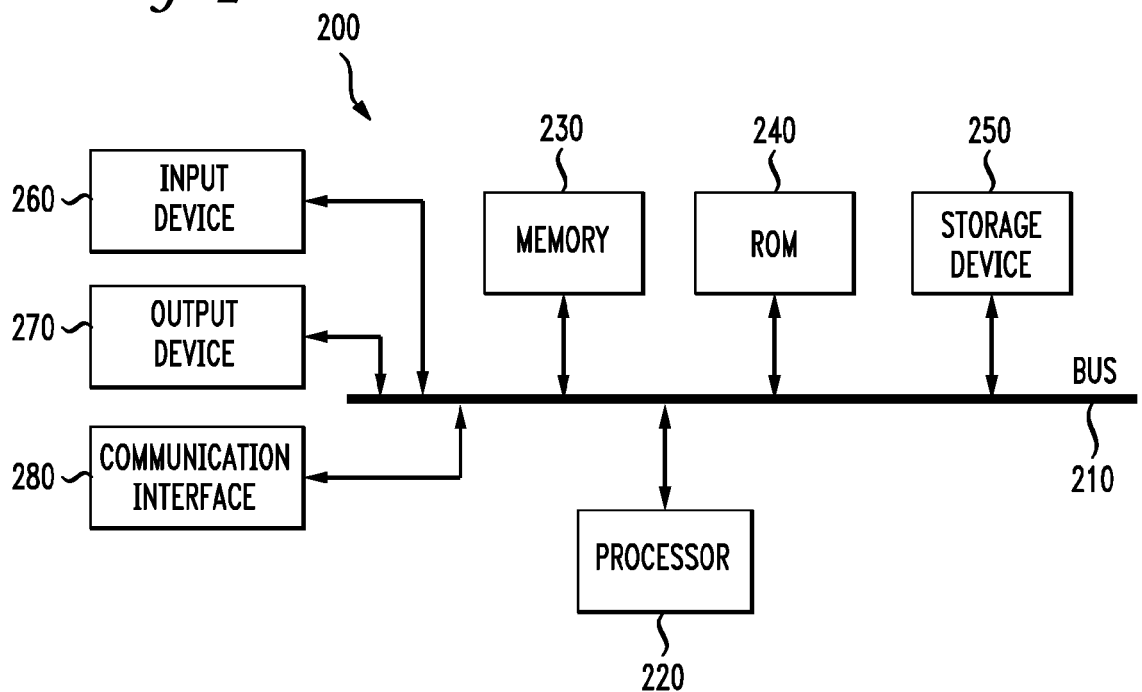
FIG. 2 illustrates an exemplary processing system that may be used to implement one or more components of the exemplary natural language spoken dialog system of FIG. 1.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive. Tangible computer-readable storage media, computer-readable storage devices, or computer-readable memory devices, expressly exclude media such as transitory waves, energy, carrier signals, electromagnetic waves, and signals per se.

Input device 260 may include one or more conventional mechanisms that permit a user to input information to system 200, such as a keyboard, a mouse, a pen, a microphone, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Reusable Library Components

Data for a new application of a natural language spoken dialog system are typically collected and transcribed. A user experience (UE) expert may help to define the new application by evaluating an initial set of transcribed utterances and determining relevant labels or call-types and named entities for these utterances. Some examples of call-types may include for example, customer service request ("I would like to be added to your mailing list"), or customer service complaint ("I would like to report a problem with my service").

The UE expert may also select positive (label applies) and negative (label does not apply) guideline utterances for each label (or call-type). These guideline utterances and descriptions of the labels may be included in an annotation guide. The annotation guide may be organized by category areas where call-types within the same category may be grouped together (for example, "Billing Queries" might be one of the categories). A set of labelers may use the annotation guide to label additional transcribed utterances.

A library of reusable components may include spoken language understanding (SLU) models, automatic speech recognition (ASR) models, named entity grammars or models, manual transcriptions, ASR transcriptions, call-type labels, audio data (utterances), dialog level templates, prompts, and other reusable data. [Note: a dialog template is a parameterized portion of the call flow to perform a specific task, for example, collecting the user's SSN. In other words, it is similar to the concept of function calls in a traditional software library where the function arguments describe the input/output parameters. In the DM template case, and especially for natural language dialogs, in addition to the usual parameters such as prompts and grammars, there are exceptions that have to be handled in the context of the whole application. These are called context shifts. Imagine the system asking for a confirmation "Do you want your bill summary?" (yes/no question) and the user replying with "No, I'd rather have it faxed to my home number". The DM template has to capture and handle this context shift which is domain dependent (yes/no questions are generic) and send it back to the main context shift handler. So, it is typical to use templates from a library that are cloned and modified in the context of the specific dialog (changes in the specific application context will not propagate back to the library)]. Thus, the library may include a collection of data from existing natural language spoken dialog systems.

The effort involved in maintaining a library has many benefits. For example, defining an extensible taxonomy of call-type categories may promote uniformity and reduce time and effort required when a new set of data is encountered. Moreover, a library may add organization that helps document the natural language spoken dialog system and may be used to bootstrap future natural language spoken dialog systems.

Data Organization of Reusable Components

The data may be organized in various ways. For instance, in an implementation consistent with the principles of the invention, the data may be organized by industrial sector, such as, for example, financial, healthcare, insurance, etc. Thus, for example, to create a new natural language spoken dialog system in the healthcare sector, all the library components from the healthcare sector could be used to bootstrap the new natural language spoken dialog system. Alternatively, in other implementations consistent with the principles of the invention the data may be organized by category (e.g., Service Queries, Billing Queries, etc.) or according to call-types of individual utterances, or by words in the utterances such as, for example, frequently occurring words in utterances.

Any given utterance may belong to one or more call-types. Call-types may be given mnemonic names and textual descriptions to help describe their semantic scope. In some implementations, call-types can be assigned attributes which may be used to assist in library management, browsing, and to provide a level of discipline to the call-type design process. Attributes may indicate whether the call-type is generic, reusable, or specific to a given application. Call-types may include a category attribute or at a lower level may be characterized by a "verb" attribute such as "Request, Report, Ask, etc." A given call-type may belong to a single industrial sector or to multiple industrial sectors. The UE expert may make a judgment call with respect to how to organize various application data sets into industrial sectors. Because the collection of utterances for any particular application is usually done in phases, each new application may have data sets from several data collection periods. Thus, each call-type may also have an attribute describing the data collection data set.

Figure 3:
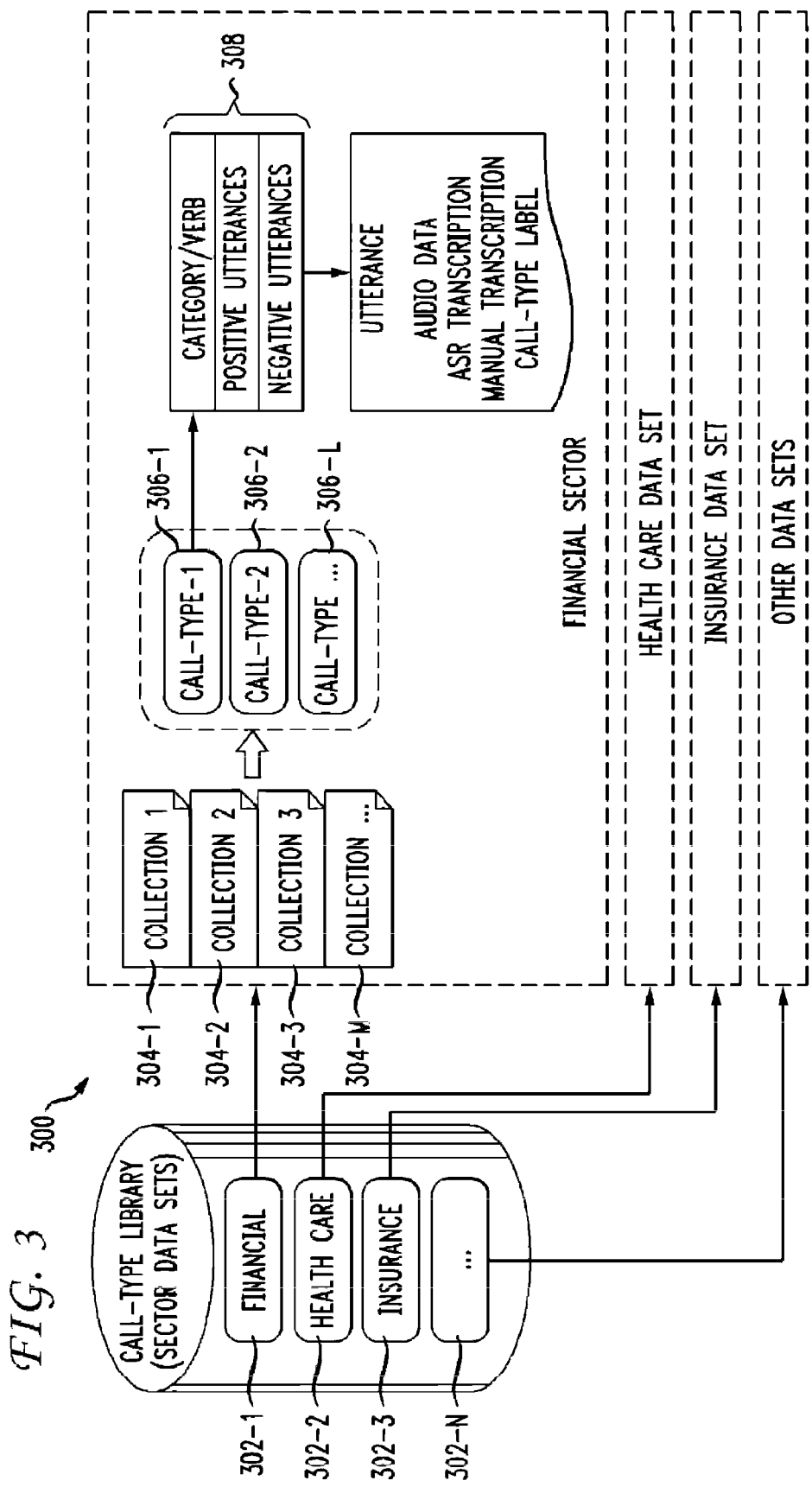
FIG. 3 shows an exemplary architecture of a library consistent with the principles of the invention.

FIG. 3 illustrates an exemplary architecture of library 300 consistent with the principles of the invention. Library 300 may include a group of datasets 302-1, 302-2, 302-3, . . . , 302-N (collectively referred to as 302) on a computer-readable medium. In one implementation, each of the datasets may include data for a particular industrial sector. For example, sector 302-1 may have data pertaining to a financial sector, sector 302-2 may have data pertaining to a healthcare sector, sector 302-3 may have data pertaining to an insurance sector, and sector 302-N may have data pertaining to another sector.

Each of sectors 302 may include an SLU model, an ASR model, and named entity grammars or models and may have the same data organization. An exemplary data organization of a sector, such as financial sector 302-1, is illustrated in FIG. 3. As previously mentioned, data may be collected in a number of phases. The data collected in a phase is referred to as a collection. Financial sector 302-1 may have a number of collections 304-1, 304-2, 304-3, . . . , 304-M (collectively referred to as 304). Collections 304 may share one or more call-types 306-1, 306-2, 306-3, . . . , 306-L (collectively referred to as 306). Each of call-types 304 may be associated with utterance data 308. Each occurrence of utterance data 308 may include a category, for example, Billing Queries, or a verb, for example, Request or Report. Utterance data 308 may also include one or more positive utterance items and one or more negative utterance items. Each positive or negative utterance item may include audio data in a form of an audio recording, a manual or ASR transcription of the audio data, and one or more call-type labels indicating the one or more call-types 306 to which the utterance data may be associated.

One of ordinary skill in the art would understand that the audio data and corresponding transcriptions may be used to train ASR module 102, and the call-type labels may be used to build new spoken language understanding (SLU) models.

The labeled and transcribed data for each of data collections 304 may be imported into separate data collection databases. In one implementation consistent with the principles of the invention, the data collection databases may be XML databases (data stored in XML), which may keep track of the number of utterances imported from each natural language speech dialog application as well as data collection dates. XML databases or files may also include information describing locations of relevant library components on the computer-readable medium including library 300. In other implementations, other types of databases may be used instead of XML databases. For example, in one implementation consistent with the principles of the invention a relational database, such as, for example, a SQL database may be used.

The data for each collection may be maintained in a separate file structure. As an example, for browsing application data, it may be convenient to represent the hierarchical structure as a tree {category, verb, call-type, utterance items}. A call-type library hierarchy may be generated from the individual data collection databases and the sector database. The call-type library hierarchy may be {sector, data collection, category, verb, call-type, utterance items}. However, users may be interested in all of the call-types with "verb=Request" which suggest that the library may be maintained in a relational database. In one implementation that employs XML databases, widely available tools can be used, such as tools that support, for example, XML or XPath to render interactive user interfaces with standard web browser clients. XPath is a language for addressing parts of an XML document. XSLT is a language for transforming XML documents into other XML documents.

In some implementations consistent with the principles of the invention, methods for building SLU models, for example, text normalization, feature extraction, and named entity extraction methods, may be stored in a file, such as an XML file or other type of file, so that the methods used to build the SLU models may be tracked. Similarly, in implementations consistent with the principles of the invention, data that is relevant to building an ASR module or dialog manager may be saved.

Figure 4:
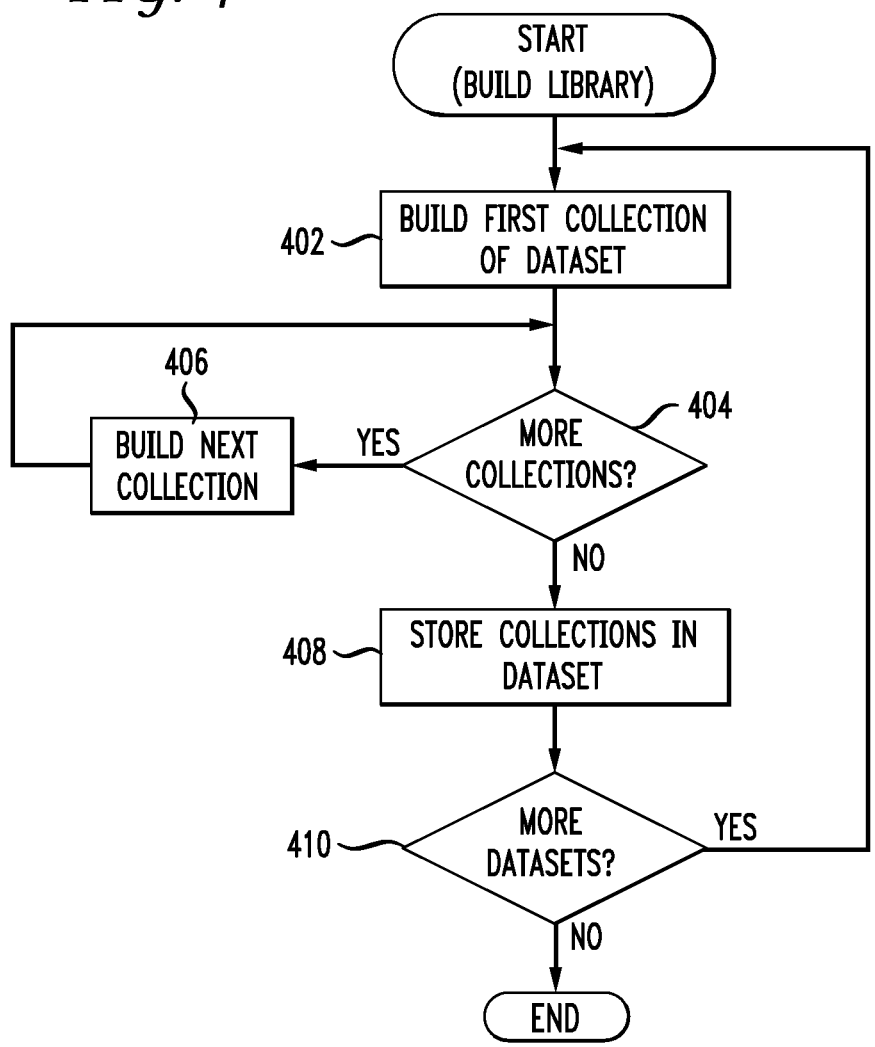
FIGS. 4 and 5 are flowcharts that explain an exemplary process for building a library of reusable components consistent with the principles of the invention.
Figure 5:
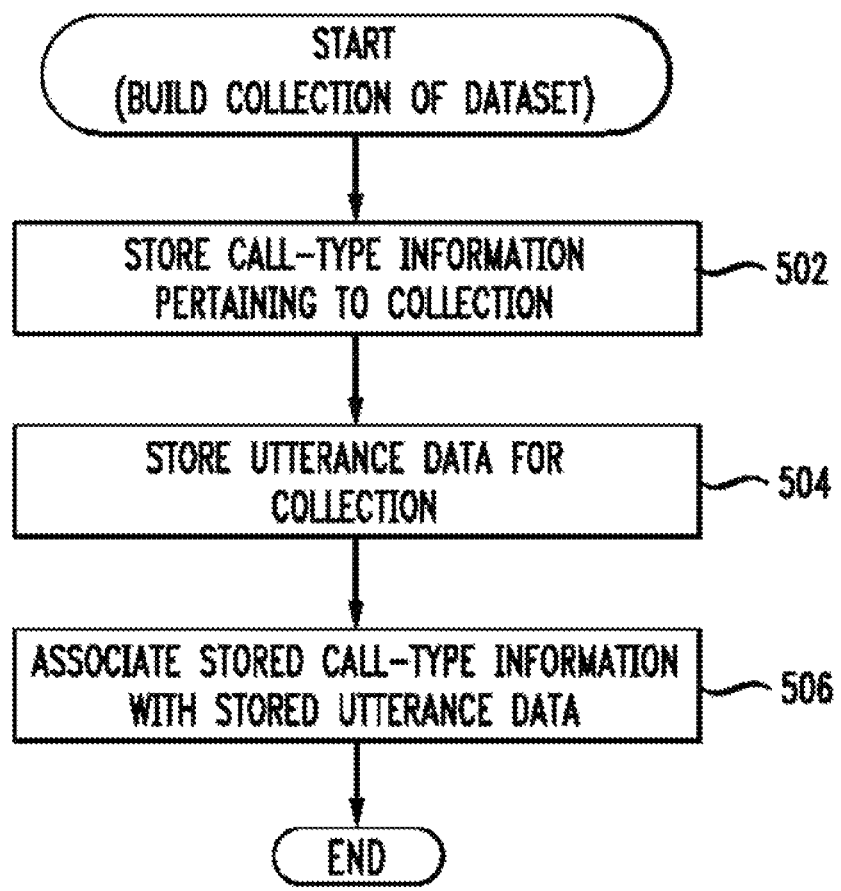

FIGS. 4 and 5 are flowcharts that help to explain an exemplary process of building a library of reusable components for building a natural language speech dialog system. The process may begin building a first collection of a dataset (act 402). Each collection may be a collection of data collected during a particular time or data collection phase.

FIG. 5 illustrates an exemplary process (act 402) that may be used to build a collection of a dataset. First, call-type or label information from a particular phase of data collection for an existing application may be stored in the collection (act 502). Next, utterance data collected for the application during the particular data collection phase may be stored in the collection (act 504). Finally, each item of stored call-type or label information may be associated with one or more occurrences of stored utterance data.

Referring back to FIG. 4, a check may be performed to determine whether any additional data from the existing application exists with respect to another phase of data collection (act 404). If the additional data exists, then acts 502-506 may be performed to build another collection from the existing application (act 406). Otherwise, the built collections are stored in the dataset (act 408) and a check is performed to determine whether additional datasets are to be built from the existing application data (act 410). As previously mentioned, each dataset may contain data for a particular application, a sector such as, for example, an industrial sector, or a category of data. If more datasets are to be built, then acts 402-410 may be repeated. Otherwise, the library building process is completed.

Those of ordinary skill in the art will appreciate that other embodiments of the invention may be practiced in network computing environments with many types of computer system configurations, including, for example, personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. A tangible computer-readable medium is an example of a memory storage device. The tangible computer-readable medium excludes software per se, energy or wireless interface. Such tangible computer-readable medium includes hardware memory components such as RAM 230, ROM 240, a hard drive 250 or the like. Thus, any such connection is properly termed a computer-readable medium.

Although the above description may contain specific details, they should not be construed as limiting the claims in any way. Other configurations of the described embodiments of the invention are part of the scope of this invention. For example, alternative methods of organizing reusable components stored in datasets may be used in implementations consistent with the principles of the invention. Further, the acts described in FIGS. 4 and 5 may be performed in a different order and still achieve desirable results. Accordingly, other embodiments are within the scope of the following claims.

We claim as our invention:

1. A method comprising:
   collecting a plurality of audible utterances, via a plurality of industry specific spoken dialog systems, and during a plurality of collection phases comprising respective defined periods of time, to yield stored audible utterances;
   organizing, via a processor, the stored audible utterances into a plurality of datasets having call-type labels, wherein each dataset in the plurality of datasets pertains to a unique industrial sector in a plurality of industrial sectors, and wherein the each dataset for its respective unique industrial sector is independent of other datasets in the plurality of industrial sectors;
   generating an annotation guide comprising mnemonic names, textual descriptions, and both a positive example utterance and a negative example utterance for an associated call-type; and
   building a natural language spoken dialog system using the plurality of datasets and the annotation guide, wherein datasets having a call-type label associated with the negative example utterance of the annotation guide are not included in the natural language spoken dialog system.

2. The method of claim 1, further comprising, prior to the building of the natural language spoken dialog system, comparing, for each of the call-type labels, each utterance in the plurality of audible utterances to the negative example utterance for the associated call-type.

3. The method of claim 1, wherein the unique industrial sector of each dataset was collected using a corresponding industry specific spoken dialog system of the plurality of industry specific spoken dialog systems.

4. The method of claim 3, wherein the corresponding industry specific spoken dialog system and the unique industrial sector share a common task domain.

5. The method of claim 1, wherein the plurality of datasets are stored in an extensible markup language database.

6. The method of claim 1, wherein the plurality of datasets are stored in a relational database.

7. The method of claim 1, wherein the plurality of audible utterances are each associated with utterance-type category.

8. A system comprising:
   a processor; and
   a computer-readable storage medium having instructions stored which, when executed by the processor, result in the processor performing operations comprising:
      collecting a plurality of audible utterances, via a plurality of industry specific spoken dialog systems, and during a plurality of collection phases comprising respective defined periods of time, to yield stored audible utterances;
      organizing the stored audible utterances into a plurality of datasets having call-type labels, wherein each dataset in the plurality of datasets pertains to a unique industrial sector in a plurality of industrial sectors, and wherein the each dataset for its unique industrial sector is independent of other datasets in the plurality of industrial sectors;
      generating an annotation guide comprising mnemonic names, textual descriptions, and both a positive example utterance and negative example utterance for an associated call-type; and
      building a natural language spoken dialog system using the plurality of datasets and the annotation guide, wherein datasets having a call-type label associated with the negative example utterance of the annotation guide are not included in the natural language spoken dialog system.

9. The system of claim 8, further comprising, prior to the building of the natural language spoken dialog system, comparing, for each of the call-type labels, each utterance in the plurality of audible utterances to the negative example utterance for the associated call-type.

10. The system of claim 8, wherein the unique industrial sector of each dataset was collected using a corresponding industry specific spoken dialog system of the industry specific spoken dialog systems.

11. The system of claim 10, wherein the corresponding industry specific spoken dialog system and the unique industrial sector share a common task domain.

12. The system of claim 8, wherein the plurality of datasets are stored in an extensible markup language database.

13. The system of claim 8, wherein the plurality of datasets are stored in a relational database.

14. The system of claim 8, wherein the plurality of audible utterances are each associated with utterance-type category.

15. A computer-readable storage device having instructions stored which, when executed by a computing device, result in the computing device performing operations comprising:
   collecting a plurality of audible utterances, via a plurality of industry specific spoken dialog systems, and during a plurality of collection phases comprising respective defined periods of time, to yield stored audible utterances;
   organizing the stored audible utterances into a plurality of datasets having call-type labels, wherein each dataset in the plurality of datasets pertains to a unique industrial sector in a plurality of industrial sectors, and wherein the each dataset for its respective unique industrial sector is independent of other datasets in the plurality of industrial sectors;

generating an annotation guide comprising mnemonic names, textual descriptions, and both a positive example utterance and negative example utterance for an associated call-type; and building a natural language spoken dialog system using the plurality of datasets and the annotation guide, wherein datasets having a call-type label associated with the negative example utterance of the annotation guide are not included in the natural language spoken dialog system.

16. The computer-readable storage device of claim 15, further comprising, prior to the building of the natural language spoken dialog system, comparing, for each of the call-type labels, each utterance in the plurality of audible utterances to the negative example utterance for the associated call-type.

17. The computer-readable storage device of claim 15, wherein the unique industrial sector of each dataset was collected using a corresponding industry specific spoken dialog system of the industry specific spoken dialog systems.

18. The computer-readable storage device of claim 17, wherein the corresponding industry specific spoken dialog system and the unique industrial sector share a common task domain.

19. The computer-readable storage device of claim 15, wherein the plurality of datasets are stored in an extensible markup language database.

20. The computer-readable storage device of claim 15, wherein the plurality of datasets are stored in a relational database.

* * * * *